United States Patent
Wang et al.

(10) Patent No.: US 9,108,280 B2
(45) Date of Patent: Aug. 18, 2015

(54) DEVICE HAVING RAIL AND BLOCK AND METHOD FOR MANUFACTURING THE SAME

(71) Applicant: METAL INDUSTRIES RESEARCH & DEVELOPEMENT CENTRE, Kaohsiung (TW)

(72) Inventors: Wen-Yen Wang, Kaohsiung (TW); Yi-An Chen, Kaohsiung (TW); Chun-Chieh Wang, Kaohsiung (TW); Chia-Min Wei, Tainan (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 167 days.

(21) Appl. No.: 13/726,911

(22) Filed: Dec. 26, 2012

(65) Prior Publication Data
US 2014/0177984 A1  Jun. 26, 2014

(51) Int. Cl.
*F16C 29/02* (2006.01)
*B23P 17/04* (2006.01)

(52) U.S. Cl.
CPC .............. *B23P 17/04* (2013.01); *F16C 29/02* (2013.01); *Y10T 29/49993* (2015.01)

(58) Field of Classification Search
USPC .......... 384/7, 8, 25, 26, 42, 45; 29/530
See application file for complete search history.

(56) References Cited

U.S. PATENT DOCUMENTS

| | | | | |
|---|---|---|---|---|
| 4,615,569 A | * | 10/1986 | Hirata | 384/45 |
| 5,582,487 A | * | 12/1996 | Teramachi | 384/45 |
| 2003/0030181 A1 | * | 2/2003 | Raghunathan et al. | 264/280 |

* cited by examiner

*Primary Examiner* — Thomas Diaz
(74) *Attorney, Agent, or Firm* — WPAT, PC; Justin King

(57) ABSTRACT

A device having a rail and a block includes a rail and a block. The rail includes a body and a hollow inside, the hollow inside being located inside the body. The hollow inside of the rail is provided with a lightweight, shock absorption and sound absorption material, and the lightweight, shock absorption and sound absorption material is selected from a group consisting of foam metal material, polystyrene, asbestos, foam, plastic, and rubber. The block is adapted for sliding along the rail to finish a slide path.

8 Claims, 8 Drawing Sheets

DEVICE HAVING RAIL AND BLOCK AND METHOD FOR MANUFACTURING THE SAME

BACKGROUND OF THE INVENTION

1. Field of Invention

The present invention relates to a method for manufacturing a device having a rail and a block, and more particularly to a device having a rail and a block, wherein the hollow inside of the rail and/or block is provided with a lightweight, shock absorption and sound absorption material.

2. Related Art

A common machine tool (such as Wafer processing equipment and CNC equipment) often utilizes a linear guideway and a ball screw to enable a work platform to displace towards multiple directions, so as to enhance the convenience in processing.

Referring to FIG. 1, a ball-type linear guideway 10 of a conventional machine tool is taken as an example, and mainly includes a linear rail 11, multiple blocks 12 capable of sliding along the linear rail 11, and a plurality of balls 13 disposed inside the block 12 and rolling around. The linear rail 11 has a left side 113 and a right side 114, which are formed with two guiding grooves 111 and 112, respectively. The block 12 has a notch 121 and two ball grooves 122, 123, the notch 121 is used for inserting the linear rail 11, the two ball grooves 122, 123 are corresponding to the guiding grooves 111, 112 and used to cause parts of balls 13 to pass therethrough. The balls 13 may contact with the ball grooves 122, 123 and the guiding grooves 111, 112, so that the block 12 may slide along the linear rail 11 at a high speed by utilizing the rolling of the balls 13, so as to achieve the objective of displacing a work platform (not shown) according to a processing demand.

However, unavoidable vibrations occur when the block 12 supports the work platform to slide. The block 12 may apply a suitable precompression on the linear rail 11 by using the balls 13, so as to achieve sufficient stability. Nonetheless, in the case that the block 12 fails to prevent vibrations from being transferred to the linear rail 11, the block 12 and the linear rail 11 are usually fast worn due to resonance, resulting in significant reduction of the service life of the block 12 and the linear rail 11. Moreover, a lot of noises and vibrations occur during a high speed motion of the block 12 and linear rail 11.

Therefore, it is necessary to provide a device having a rail and a block and a method for manufacturing the same capable of solving the above problems.

SUMMARY OF THE INVENTION

An objective of the present invention is to reduce noises and vibrations during high speed movement by disposing a lightweight, shock absorption and sound absorption material in a hollow inside of a rail and/or block.

To achieve the above objective, the present invention provides a device having a rail and a block, the device including a rail and a block. The rail includes a body and a hollow inside, the hollow inside being located inside the body. The hollow inside of the rail is provided with a lightweight, shock absorption and sound absorption material, and the lightweight, shock absorption and sound absorption material is selected from a group consisting of foam metal material, polystyrene, asbestos, foam, plastic, and rubber. The block is adapted for sliding along the rail to finish a slide path.

The block also includes a body and a hollow inside, the hollow inside being located inside the body, wherein the hollow inside of the block is also provided with a lightweight, shock absorption and sound absorption material, and the lightweight, shock absorption and sound absorption material is selected from a group consisting of foam metal material, polystyrene, asbestos, foam, plastic, and rubber.

The device having a rail and a block of the present invention may provide a more lightweight design under a bearable load, so as to reduce the occurrence of an inertia force during high speed movement of the block. Moreover, the hollow inside is provided with a lightweight, shock absorption and sound absorption material, so as to reduce noises and vibrations during high speed movement, thereby creating a movement mode with a higher precision.

To make the above and other objectives, features, and advantages of the present invention more comprehensible, detailed illustration is provided below with reference to the accompanying drawings.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
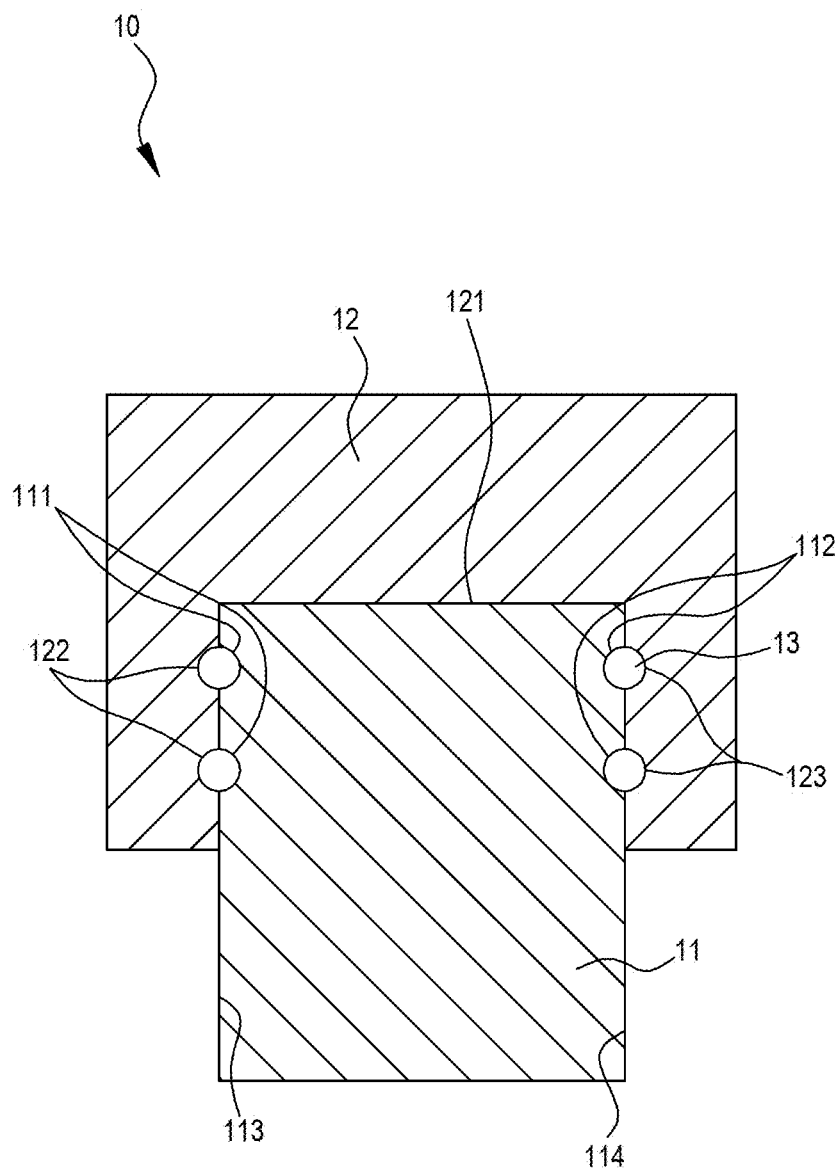
FIG. 1 is a schematic sectional view of a ball-type linear guideway of a conventional machine tool.
Figure 2:
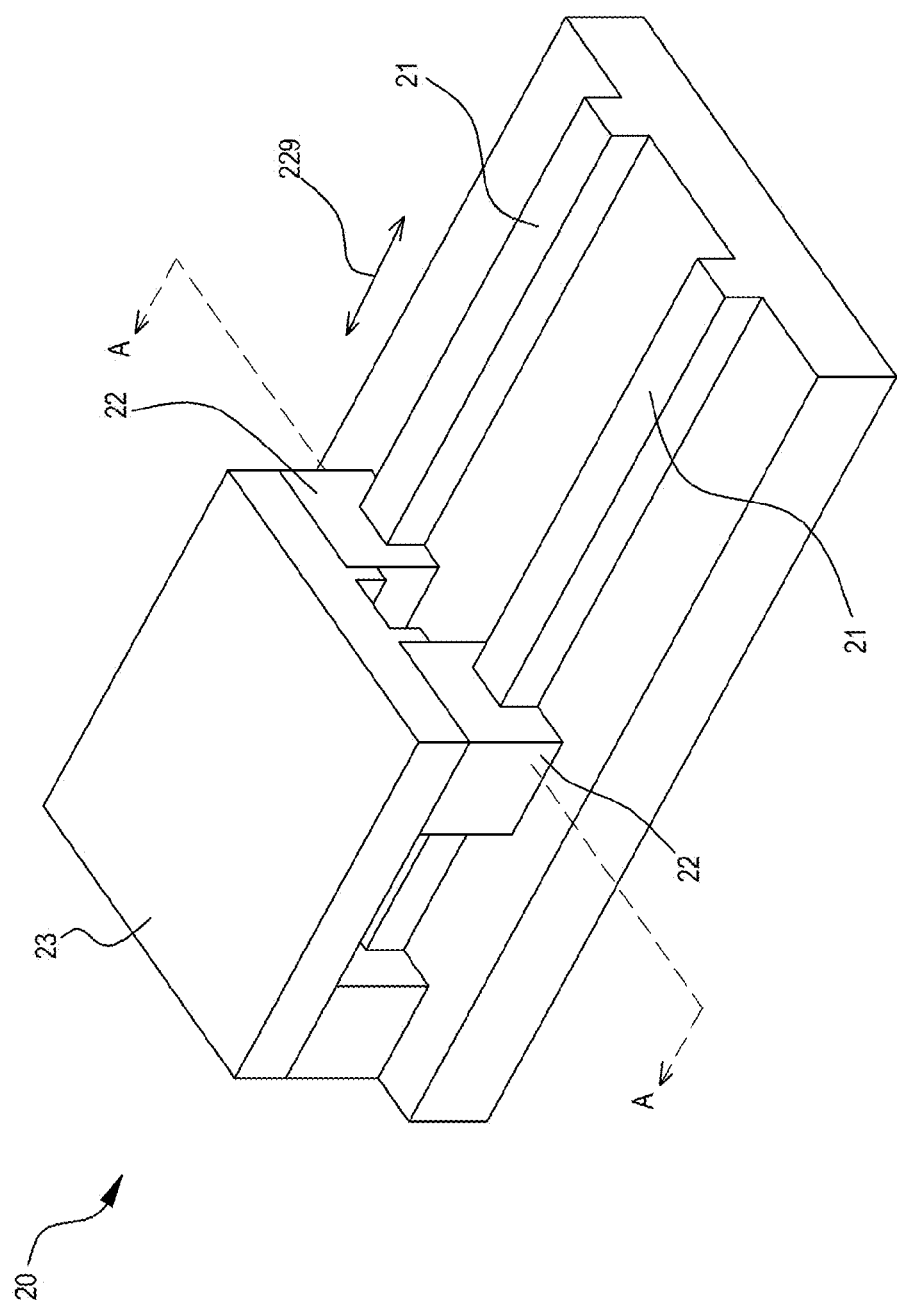
FIG. 2 is a 3D schematic view of a device having a rail and a block according to a first embodiment of the present invention.
Figure 3:
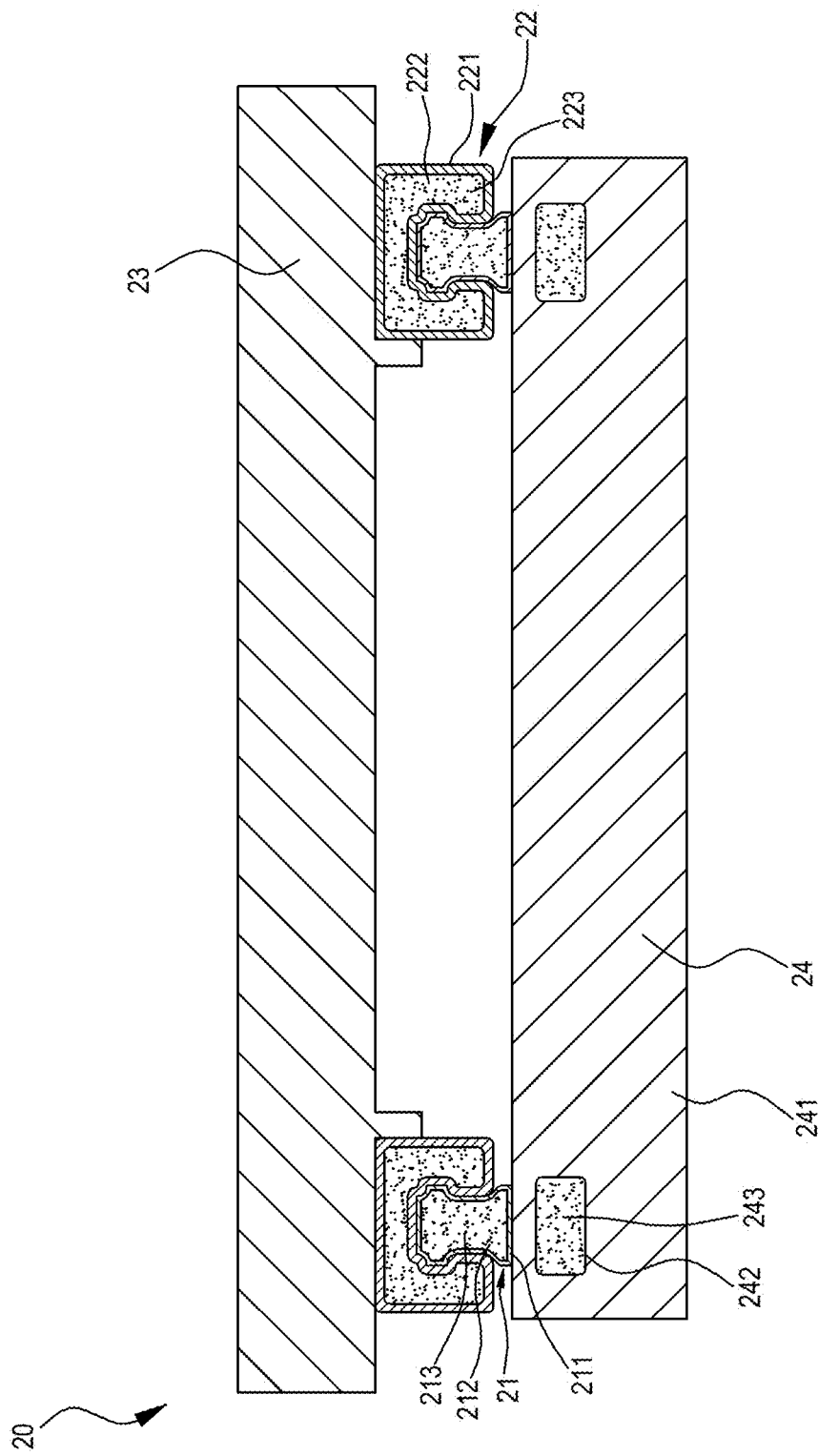
FIG. 3 is a schematic sectional view of the device having a rail and a block along a sectional line A-A in FIG. 2.

FIG. 2 and FIG. 3 show a device 20 having a rail and a block according to a first embodiment of the present invention. A device 20 is applicable to a machine tool or a precision machine. The machine tool or precision machine (such as Wafer processing equipment and CNC equipment) utilizes a rail 21, a block 22 and a ball screw (not shown) to enable a work platform 23 to displace along the direction of the rail 21, thereby enhancing the convenience in processing.

The device 20 includes at least one rail 21 and at least one block 22. In this embodiment, two rails 21 and four blocks 22 are used to illustrate the present invention. In another embodiment, one rail 21 and one block 22 may also be used to implement the present invention. The rail 21 may be a linear rail. The block 22 is adapted for sliding along the rail 21 to finish a slide path 229 (as shown in FIG. 2). The block 22 has a shape feature similar to an n-shape, and the inner size of the n-shape matches with the shape of the rail 21. The full-length range of the block 22 is generally between 20 mm and 2,000 mm, and the full-length range of the rail 21 is generally between 50 mm and 5,600 mm.

The device 20 having a rail and a block may include balls (not shown) implanted inside the block 22 and rolling around, wherein the balls are used for enabling the block 22 to slide at a high speed along the linear rail 21 through the rolling of the balls, so as to achieve the objective of displacing a work platform (not shown) according to a processing demand.

Figure 4:
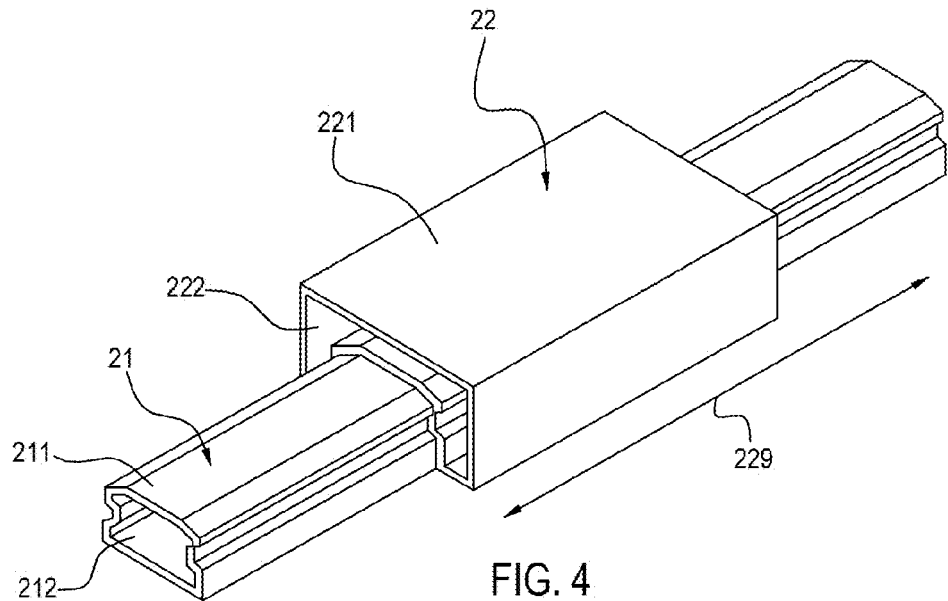
FIG. 4 is a 3D schematic view of a rail and a block according to the first embodiment of the present invention, showing that the hollow insides of the rail and the block are not provided with a lightweight, shock absorption and sound absorption material.
Figure 5:
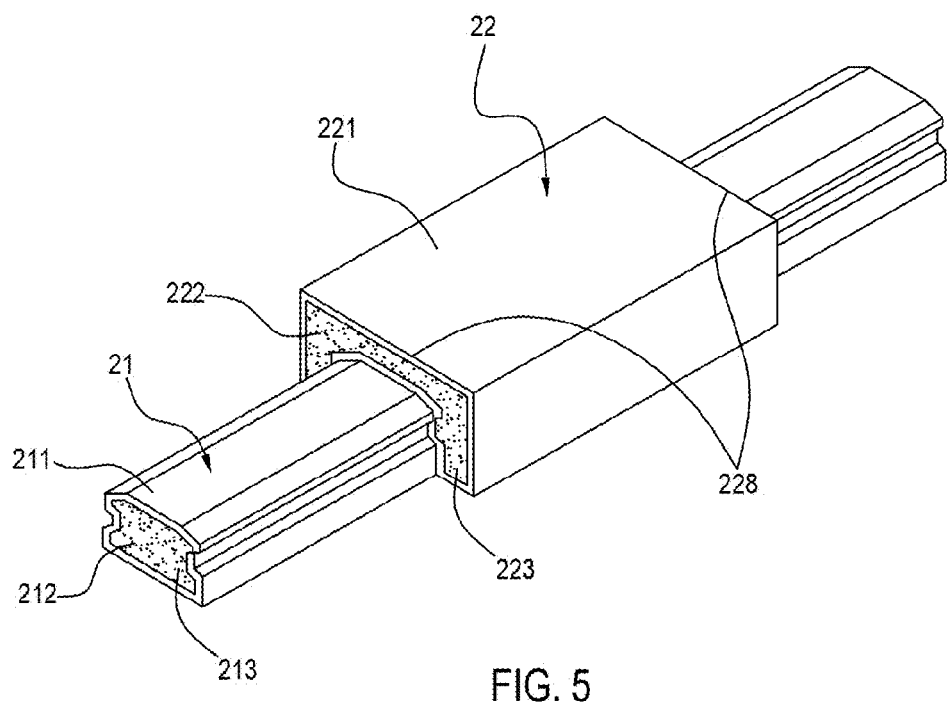
FIG. 5 is a 3D schematic view of a rail and a block according to the first embodiment of the present invention, showing that the hollow insides of the rail and the block are provided with a lightweight shock absorption and sound absorption material.
Figure 6:
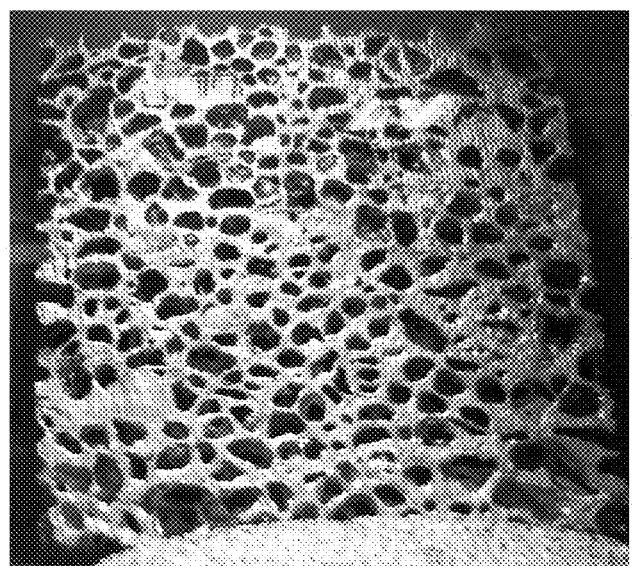
FIG. 6 shows the foam metal material being enclosed porous foam aluminum according to the present invention.

Referring to FIG. 4, the rail 21 includes a body 211 and a hollow inside 212, the hollow inside 212 being located inside the body 211. The hollow inside 212 of the rail 21 may extend along the slide path 229 of the block 22. Referring to FIG. 5 and FIG. 3, the hollow inside 212 of the rail 21 is provided with a lightweight, shock absorption and sound absorption material 213 to enhance the strength of the internal structure thereof. The lightweight, shock absorption and sound absorption material 213 is selected from a group consisting of foam metal material, polystyrene, asbestos, foam, plastic, and rubber. Preferably, the foam metal material may be enclosed porous foam aluminum, as shown in FIG. 6.

Further referring to FIG. 4 and FIG. 5, the block 22 also includes a body 221 and a hollow inside 222, the hollow inside 222 being located inside the body 221. The hollow inside 222 of the block 22 is also provided with a lightweight, shock absorption and sound absorption material 223, so as to enhance the strength of the internal structure thereof and absorb vibrations that occur during the movement of the block 22. The lightweight, shock absorption and sound absorption material 223 is selected from a group consisting of foam metal material, polystyrene, asbestos, foam, plastic, and rubber. Preferably, the foam metal material may be enclosed porous foam aluminum. The block 22 may further include plastic end covers (not shown), which are disposed at two end surfaces 228 of the block 22, as shown in FIG. 5.

The body 221 of the block 22 and the body 211 of the rail 21 may made of carbon steel, alloy steel, stainless steel, aluminum alloy, high stiffness and high wear resistance alloy metal, and the wall thickness thereof may be between about 0.1 mm and 10 mm.

Further referring to FIG. 3, the device 20 having a rail and a block further includes a lathe bed 24, which supports the rail 21. The rail 21 may be locked at the lathe bed 24. The lathe bed 24 also includes a body 241 and a hollow inside 242, the hollow inside 242 being located inside the body 241. The hollow inside 241 of the lathe bed 24 may extend along the rail 21. The hollow inside 242 of the lathe bed 24 is also provided with a lightweight, shock absorption and sound absorption material 243, so as to enhance the strength of the internal structure thereof. The lightweight, shock absorption and sound absorption material 243 is selected from a group consisting of foam metal material, polystyrene, asbestos, foam, plastic, and rubber.

The present invention uses the form of a hollow inside provided with a lightweight, shock absorption and sound absorption material to replace a solid or rib internal structure of a linear guideway, so as to reduce the weight of the linear guideway by 30% to 50%. Moreover, the present invention use pipe materials as the basic material of the rail and block instead of general solid bar materials, so as to reduce the cost of material by about 50%.

The device having a rail and a block of the present invention may provide a more lightweight design under a bearable load, so as to reduce the occurrence of an inertia force during high speed movement of the block. Moreover, the hollow inside is provided with a lightweight, shock absorption and sound absorption material, so as to reduce noises and vibrations during high speed movement, thereby creating a movement mode with a higher precision.

Figure 7:
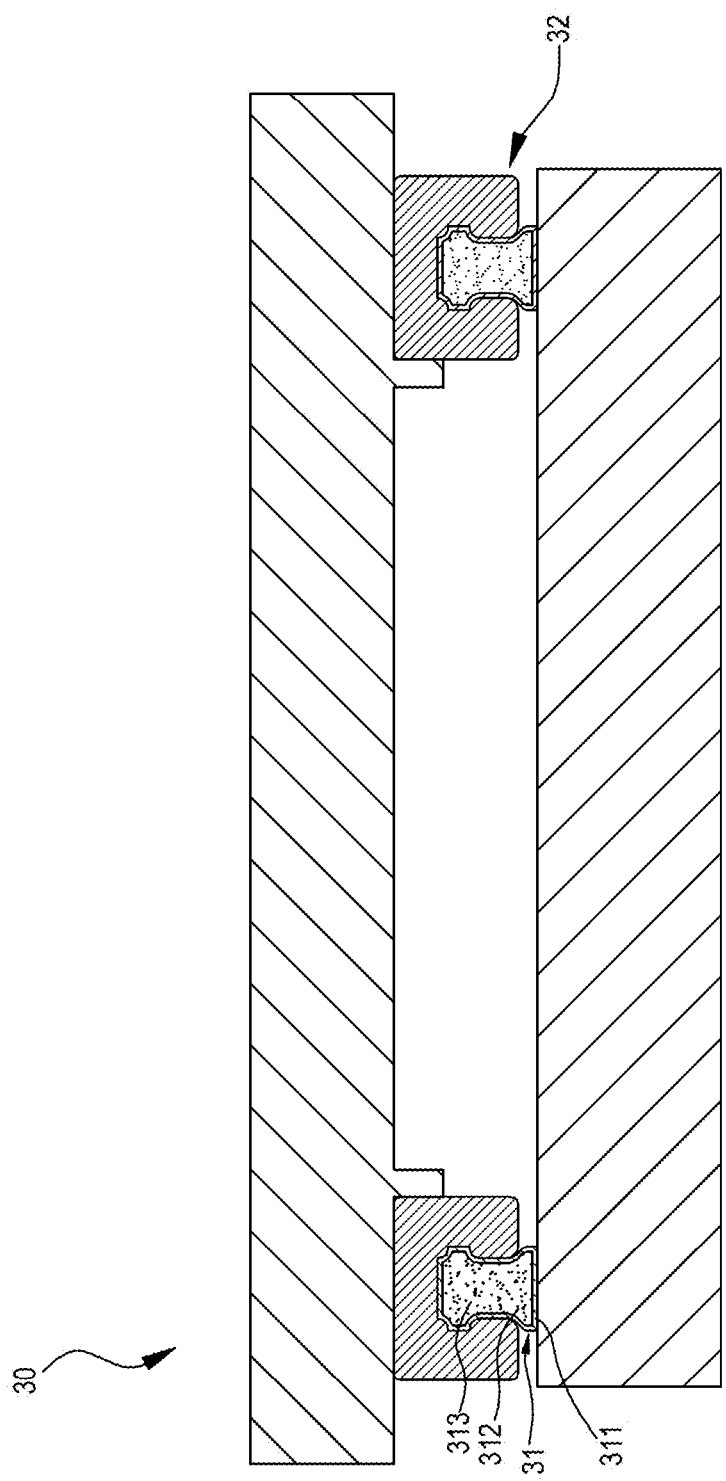
FIG. 7 is a schematic sectional view of a device having a rail and a block according to a second embodiment of the present invention.

FIG. 7 shows a device 30 having a rail and a block according to a second embodiment of the present invention. The device 30 includes a rail 31 and a block 32. The device 30 having a rail and a block of the second embodiment is basically similar to the device 20 having a rail and a block in the first embodiment, and similar elements are marked by similar reference numerals. The difference between the second embodiment and the first embodiment is that only the rail 31 includes a hollow inside 312, the hollow inside being located a body 311. In this embodiment, it may be separately implemented that the hollow inside 312 of the rail 31 is provided with a lightweight, shock absorption and sound absorption material 313, and the lightweight, shock absorption and sound absorption material 313 is selected from a group consisting of foam metal material, polystyrene, asbestos, foam, plastic, and rubber. Preferably, the foam metal material may be foam aluminum having a porous structure.

Figure 8:
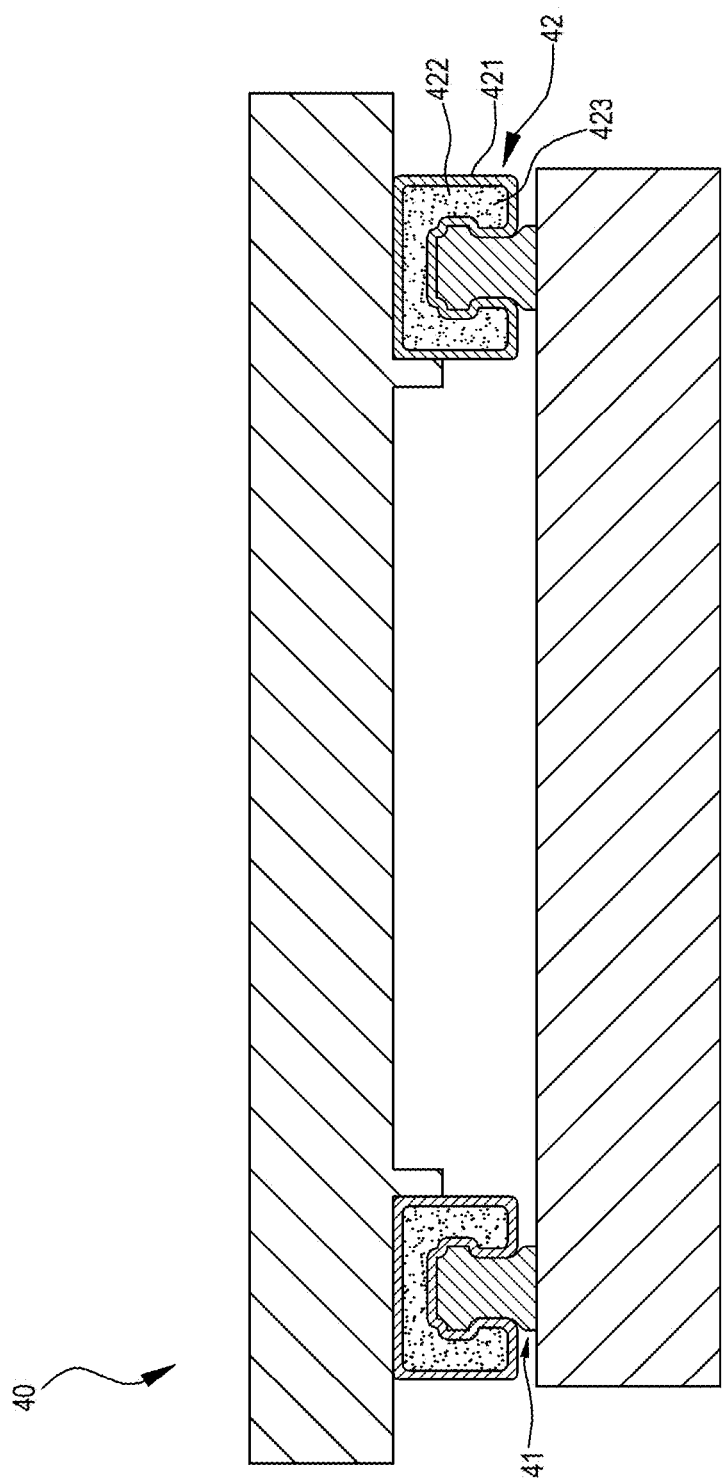
FIG. 8 is a schematic sectional view of a device having a rail and a block according to a third embodiment of the present invention.

FIG. 8 shows a device 40 having a rail and a block according to a third embodiment of the present invention. The device 40 includes a rail 41 and a block 42. The device 40 having a rail and a block of the third embodiment is basically similar to the device 20 having a rail and a block in the first embodiment, and similar elements are marked by similar reference numerals. The difference between the third embodiment and the first embodiment is that only the block 42 includes a hollow inside 422, the hollow inside 422 being located a body 421. In this embodiment, it may be separately implemented that the hollow inside 422 of the block 42 is provided with a lightweight, shock absorption and sound absorption material 423, and the lightweight, shock absorption and sound absorption material 423 is selected from a group consisting of foam metal material, polystyrene, asbestos, foam, plastic, and rubber. Preferably, the foam metal material may be foam aluminum having a porous structure.

Figure 9:
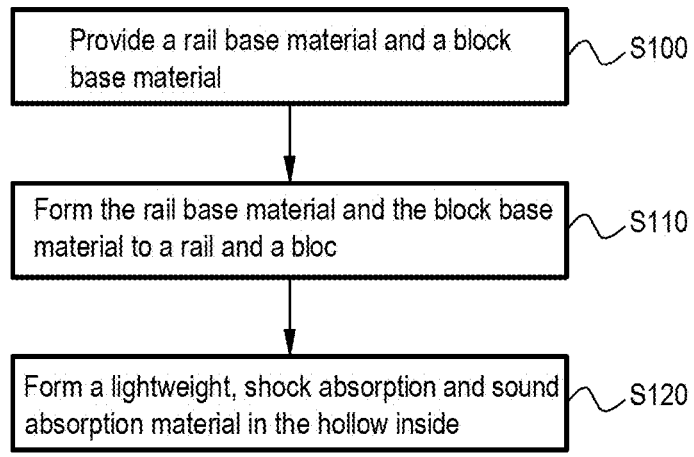
FIG. 9 is a flow diagram of a method for manufacturing the device having a rail and a block according to the first embodiment of the present invention.

FIG. 9 shows a method for manufacturing a device having a rail and a block according to the first embodiment of the present invention. The method for manufacturing the device having a rail and a block includes the following steps: in Step S100, a rail base material and a block base material are provided, wherein at least one of the rail base material and the block base material includes a body and a hollow inside, the hollow inside being located inside the body. In Step S110, by a formation process, the rail base material and the block base material are formed to a rail and a block. The formation process is that the rail and the block are made of a pipe material, extrusion material or rolling material by hydraulic or rolling formation process together with a complex precision pulling process. In Step S120, a lightweight, shock absorption and sound absorption material is formed in the hollow inside, wherein the lightweight, shock absorption and sound absorption material is selected from a group consisting of foam metal material, polystyrene, asbestos, foam, plastic, and rubber. For example, a base material of high strength low alloy steel is processed to a hollow rail and a hollow block. Next, through powder metallurgy principles, aluminum powder and a foaming agent are fully mixed and forged and pressed to a blank, and the blank is then extruded to an extruded material to serve as a pre-foaming material. Finally, the pre-foaming material is cut to a measured suitable length, then placed inside the hollow rail and the hollow block, and sent into a heating furnace to perform heating and foaming formation on the pre-foaming material inside the hollow rail and the hollow block. After the formation is finished and the rail and the block are cooled, the rail and the block including foam aluminum may be obtained.

Figure 10:
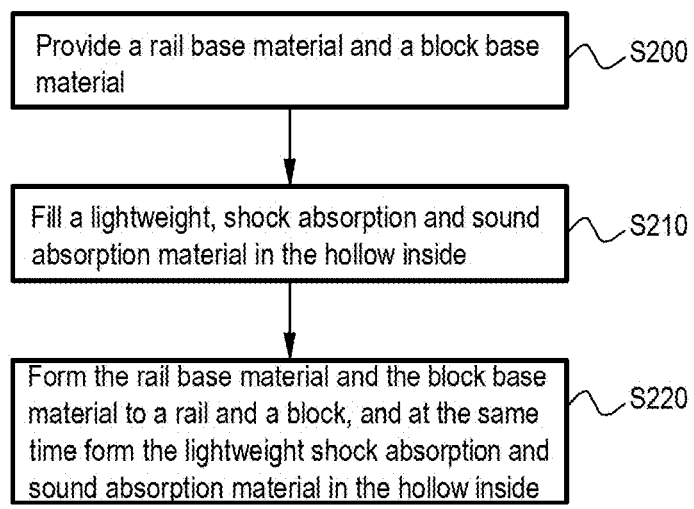
FIG. 10 is a flow diagram of a method for manufacturing the device having a rail and a block according to the second embodiment of the present invention.

FIG. 10 shows a method for manufacturing a device having a rail and a block according to the second embodiment of the present invention. The method for manufacturing the device having a rail and a block according to the second embodiment is basically similar to the method for manufacturing the device having a rail and a block according to the first embodiment. The method for manufacturing the device having a rail and a block includes the following steps: in Step S200, a rail base material and a block base material are provided, wherein at least one of the rail base material and the block base material includes a body and a hollow inside, and the hollow inside being located inside the body. In Step S210, a lightweight, shock absorption and sound absorption material is filled in the hollow inside, wherein the lightweight, shock absorption and sound absorption material is selected from a group consisting of foam metal material, polystyrene, asbestos, foam, plastic, and rubber. In Step S220, by a formation process, the rail base material and the block base material are formed to a rail and a block, and at the same time the lightweight, shock absorption and sound absorption material are formed in the hollow inside.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device having a rail and a block, comprising:
a rail, comprising a body and a hollow inside, the hollow inside being located inside the body, wherein the hollow inside of the rail is provided with a lightweight, shock absorption and sound absorption material, and the lightweight shock absorption and sound absorption material is a first foam metal material;
a block, adapted for sliding along the rail to finish a slide path; and
a lathe bed, adapted for supporting the rail, wherein the lathe bed also comprises a body and a hollow inside, the hollow inside is located inside the body, the hollow inside of the lathe bed is also disposed with a lightweight shock absorption and sound absorption material, and the lightweight shock absorption and sound absorption material is selected from a group consisting of foam metal material, polystyrene, asbestos, foam, plastic, and rubber.

2. The device having a rail and a block according to claim 1, wherein the hollow inside of the rail extends along the slide path of the block.

3. The device having a rail and a block according to claim 1, wherein the first foam metal material is an enclosed porous foam aluminum.

4. The device having a rail and a block according to claim 1, wherein the hollow inside of the lathe bed extends along the rail.

5. The device having a rail and a block according to claim 1, wherein the block also comprises a body and a hollow inside, the hollow inside being located inside the body, wherein the hollow inside of the block is also provided with a lightweight, shock absorption and sound absorption material, and the lightweight, shock absorption and sound absorption material is a second foam metal material.

6. The device having a rail and a block according to claim 5, wherein the second foam metal material is an enclosed porous foam aluminum.

7. A device having a rail and a block, comprising:
a rail;
a block, adapted for sliding along the rail, and comprising a body and a hollow inside, the hollow inside being located inside the body, wherein hollow inside of the block is provided with a lightweight, shock absorption and sound absorption material, and the lightweight shock absorption and sound absorption material is a foam metal material; and
a lathe bed, adapted for supporting the rail, wherein the lathe bed also comprises a body and a hollow inside, the hollow inside is located inside the body, the hollow inside of the lathe bed is also provided with a lightweight shock absorption and sound absorption material, and the lightweight, shock absorption and sound absorption material is selected from a group consisting of foam metal material, polystyrene, asbestos, foam, plastic, and rubber.

8. The device having a rail and a block according to claim 7, wherein the foam metal material is an enclosed porous foam aluminum.

* * * * *